(No Model.) 2 Sheets—Sheet 2.
G. F. PAGE.
ROAD ENGINE.
No. 296,998. Patented Apr. 15, 1884.
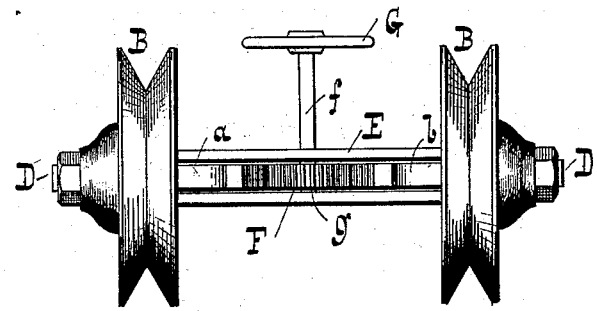
- FIG IV -
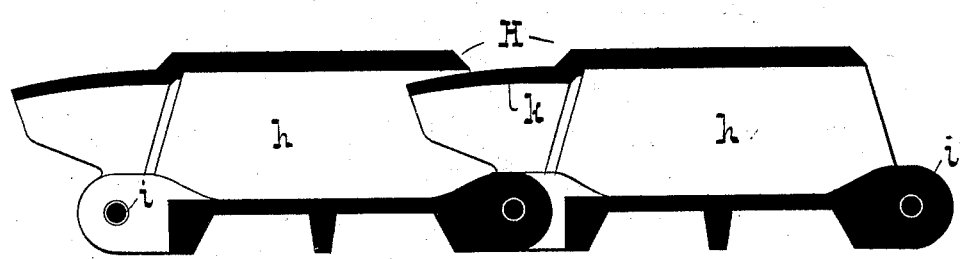
- FIG V -
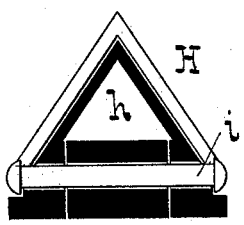
- FIG VI -
WITNESSES
Danl Fisher
Chas. B. Cassady
INVENTOR
George F. Page
by G. H. W. Howard
Attys.
N. PETERS, Photo-Lithographer, Washington, D. C.

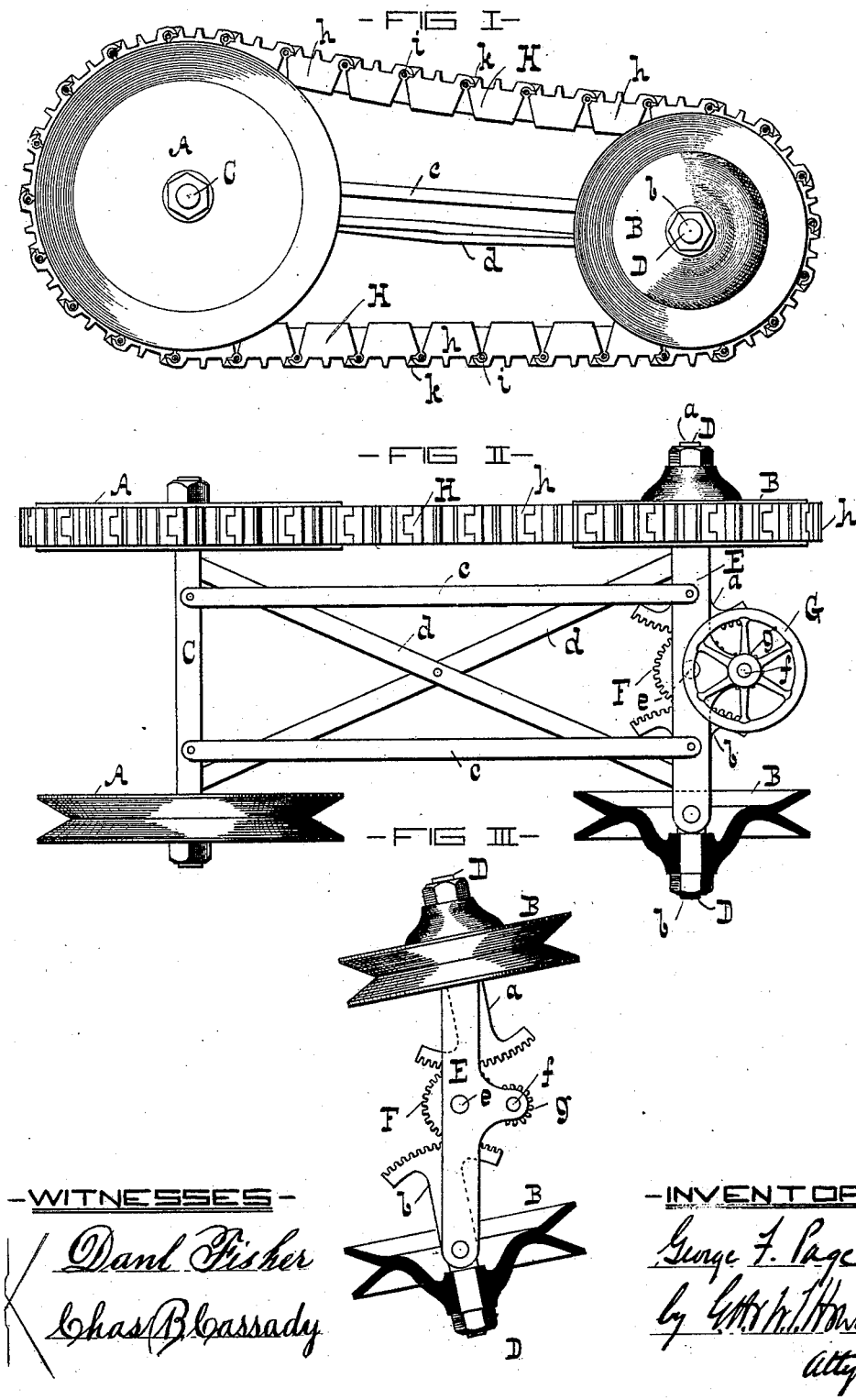

UNITED STATES PATENT OFFICE.

GEORGE F. PAGE, OF BALTIMORE, MARYLAND.

ROAD-ENGINE.

SPECIFICATION forming part of Letters Patent No. 296,998, dated April 15, 1884.

Application filed January 5, 1884. (No model.)

*To all whom it may concern:*

Be it known that I, GEORGE F. PAGE, of the city of Baltimore, and State of Maryland, have invented certain Improvements in Road-Engines, of which the following is a specification.

This invention relates to certain improvements in that class of road-engines in which the driving and pilot or guiding wheels are connected by a chain or series of links, which together form an endless track which the wheels traverse in the movement of the engine.

In the drawings forming a part hereof, Figure I is an exterior side view of the wheels and axles and the endless track of the road-engine. Fig. II is a plan of Fig. I, with one of the pilot-wheels shown in section. Fig. III illustrates the movement of the wheels and their axle. Fig. IV is a front view of Fig. I. Figs. V and VI are enlarged views of parts of the track.

A A are the driving, and B B the pilot or guiding wheels of the engine, running loosely on their respective axles, C and D. The driving-wheels are moved in the usual way from the engine, which, as it embodies no part of the present invention, is not shown or described herein. The axle D of the pilot-wheels is in two parts, (denoted by $a$ and $b$,) and they are each pivoted independently to a frame, E, supported by the brace-rods $c$ and $d$ from the driving-axle C. The inner ends of the sections $c$ and $d$ of the axle D are toothed and connected by means of a spur-gear, F, on a shaft, $e$, which may be partially revolved to turn the pilot-wheels, as shown in Fig. III, from the hand-wheel G, through the medium of the shaft $f$ and pinion $g$. The hand-wheel G can be applied to an extension of the shaft $e$; but the arrangement shown in the drawings is preferred, as less power is required to effect the result, and the movement of the hand-wheel is in the same direction as that of the pilot-wheels.

By reference to Figs. II and III it will be seen that the pivotal point around which each pilot-wheel turns is on a line drawn through the center of the rim, the plate of the wheel being dished to admit of the connection of the axle to the frame at that point. By this construction, in turning the pilot-wheels the chain tracks are never tightened, and only slackened to a slight extent, and there is less tendency of the chains to override the edge of the pilot-wheels.

The chain track, which is denoted by H, is composed of hollow links $h$, united by bolts $i$, and each link has a curved extension, $k$, which enters the link adjoining it, to prevent stones being caught between the movable parts. The outer surface of the chain track is roughened, as is usual.

By reference to the drawings it will be seen that the track has a V cross-section, and that the wheels are similarly grooved. This construction prevents the wheels slipping on the track.

I am aware that in an engine a pair of wheels with a V-edge have been connected by means of an endless-chain track which is grooved to fit the wheels; but in this arrangement, the portion of the track resting on the ground is liable to be filled with earth and stones and contact of the chain with the wheels prevented. This difficulty is fully obviated in the employment of grooved wheels and a track, as hereinbefore described.

I claim as my invention—

1. In a road-engine, the driving and pilot wheels provided with peripheral grooves and connected by an endless chain having a V cross-section, substantially as and for the purpose specified.

2. In a road-engine, the driving and pilot wheels connected by an endless track composed of hollow links having extensions which extend into the adjoining links, substantially as and for the purpose specified.

GEORGE F. PAGE.

Witnesses:
 WM. T. HOWARD,
 CHAS. B. CASSADY.